United States Patent
Mimoto (10) Patent No.: US 7,610,021 B2
(45) Date of Patent: Oct. 27, 2009

(54) COMMUNICATION APPARATUS AND METHOD FOR PREVENTING INTERFERENCE WITH INFORMATION TRANSMITTED FROM ANOTHER COMMUNICATION APPARATUS

(75) Inventor: Akihiro Mimoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 444 days.

(21) Appl. No.: 10/785,253

(22) Filed: Feb. 23, 2004

(65) Prior Publication Data

US 2004/0176036 A1 Sep. 9, 2004

(30) Foreign Application Priority Data

Mar. 6, 2003 (JP) .............................. 2003-060209

(51) Int. Cl.
  *H04B 1/00* (2006.01)
  *H04B 7/00* (2006.01)
(52) U.S. Cl. ...................... 455/69; 455/63.1; 455/550.1
(58) Field of Classification Search .................. 455/69, 455/140, 63.1, 505, 550.1, 41.1, 41.2; 340/505, 340/572.1, 10.1, 10.52
  See application file for complete search history.

(56) References Cited

U.S. PATENT DOCUMENTS

| 4,471,345 | A |   | 9/1984  | Barrett et al. |         |
|-----------|---|---|---------|----------------|---------|
| 4,758,836 | A | * | 7/1988  | Scuilli ................... | 340/870.31 |
| 5,212,808 | A | * | 5/1993  | Su et al. ...................... | 455/502 |
| 5,214,410 | A | * | 5/1993  | Verster ........................ | 340/505 |
| 5,940,006 | A | * | 8/1999  | MacLellan et al. .......... | 340/10.1 |
| 6,055,415 | A | * | 4/2000  | Suzuki ......................... | 455/69 |
| 6,167,045 | A | * | 12/2000 | Pirovano et al. ............. | 370/389 |
| 6,177,861 | B1 |  | 1/2001  | MacLellan et al. |         |
| 7,065,782 | B2 | * | 6/2006  | Shimoji et al. .............. | 725/135 |
| 7,175,177 | B2 | * | 2/2007  | Meifu et al. ................. | 473/407 |

FOREIGN PATENT DOCUMENTS

| JP | 58-162881 A  | 9/1983  |
| JP | 08-136648 A  | 5/1996  |
| JP | 8-161653     | 6/1996  |
| JP | 08-167090 A  | 6/1996  |
| JP | 08-202906 A  | 8/1996  |
| JP | 8-335238     | 12/1996 |
| JP | 09-238115 A  | 9/1997  |
| JP | 09-321652 A  | 12/1997 |
| JP | 2000-049656 A | 2/2000 |
| JP | 2002-026760 A | 1/2002  |
| JP | 2002-162918  | 6/2002  |

\* cited by examiner

*Primary Examiner*—Nay A Maung
*Assistant Examiner*—Tuan H Nguyen
(74) *Attorney, Agent, or Firm*—Canon USA Inc IP Div (57) ABSTRACT

A communication apparatus and method for preventing interference with information transmitted from one apparatus to another apparatus. The apparatus and method comprising selecting M different numbers, receiving a signal, generating a clock from the received signal, counting the generated clock, and transmitting information according to the clock count and the selected numbers, wherein if the information is determined to be invalid, the information is re-transmitted.

3 Claims, 7 Drawing Sheets

COMMUNICATION APPARATUS AND METHOD FOR PREVENTING INTERFERENCE WITH INFORMATION TRANSMITTED FROM ANOTHER COMMUNICATION APPARATUS

BACKGROUND OF THE INVENTION

1. Field of the Invention

The present invention relates to a communication apparatus and method for preventing interference with information transmitted from another communication apparatus.

2. Description of the Related Art

Radio tags or RF-ID tags for identifying objects have attracted attention as replacements for bar codes.

In the near future, a so-called ubiquitous society will be realized in which all objects are assigned a radio tag or RF-ID tag.

Japanese Patent Laid-Open No. 2002-162918 describes a poster having a radio tag or an RF-ID tag embedded therein. When a user who sees the poster wants information of the content written in this poster, the user directs his/her receiver to the radio tag or RF-ID tag embedded in the poster to obtain ID information from the poster, and then acquires the desired information via the Internet.

However, in a society where every object contains a radio tag or RF-ID tag, users would be surrounded by a plurality of radio tags or RF-ID tags. When a user directs a receiver to the above described poster in order to acquire information from the poster, a plurality of radio tags or RF-ID tags from objects in the vicinity of the poster emit their ID information in response to an ID acquisition instruction signal issued by the receiver, thus interfering with the information the user wants.

One approach to prevent interference in acquiring ID information is using a receiver with a highly directional antenna. However, this approach is problematic in that it is inconvenient for a user to direct the antenna or the receiver itself to a radio tag or an RF-ID tag each time the user wants to acquire information. The "Smart Active Label Consortium," which was established in November 2002, has plans to provide internal batteries for radio tags or RF-ID tags so as to increase the ID information output power. As such radio tags or RF-ID tags that provide stronger transmission power will become wide-spread, thereby increasing the likelihood of interference between the various transmissions of ID information.

Japanese Patent Laid-Open No. 8-161653 describes a locator for lost objects in which a transmitter (e.g., radio tag or RF-ID tag) selects one of a plurality of frequencies (e.g., f1 to fn) and sends one ID information, including a pre-sync signal, to a receiver. The receiver receives the same ID information a plurality of the times and synchronizes the pre-sync signals and received one ID information. The goal of this invention is to ensure receipt of ID information from a specific apparatus without interference by ID information transmitted by different apparatuses by selecting the sending and receiving frequency.

The locator described in Japanese Patent Laid-Open No. 8-161653 is not useful in a very crowded place, such as an airport. In a crowded place where a plurality of radio waves can be exchanged, when a source of strong radio waves and a desired transmitter, each having different IDs, are near each other, the strong radio waves can cancel the transmission waves of the transmitter. Therefore, a user would not able to receive the ID information of the desired transmitter. Since the transmission frequency is fixed so as to coordinate with a receiver, the locator described in this publication is not suitable for an application to acquire ID information from multiple radio tags or RF-ID tags at the same time.

The locator described in Japanese Patent Laid-Open No. 8-161653 has a problem in that, in a case where a user possesses a plurality of objects which the user does not want to leave behind or lose, the user must either carry a plurality of receivers or carry a single receiver having a receiving-frequency changeover switch, which must be switched each time a plurality of objects are to be located.

The system described in Japanese Patent Laid-Open No. 8-335238 uses a locating system disclosed in U.S. Pat. No. 5,214,410 entitled "Location of objects" (i.e., so-called "Supertag" technology) to prevent interference.

In this system, a transmitter includes an internal clock generator, having the functions of using an ID transmission instruction from a receiver as a timing signal and count clock thereof in synchronization with the timing signal. The transmitter has one number stored in a read-only memory (ROM), and compares the clock count with the stored number. When a match is found, one-time transmission of ID information is carried out.

Each radio tag or RF-ID tag has a unique delay time, and has the function of transmitting information after the delay time has elapsed. If a plurality of radio tags or RF-ID tags exists, these tags do not transmit information, such as ID information, at the same time, thus preventing interference.

However, when radio tags or RF-ID tags that transmit ID information at the same time are accidentally located near each other, interference occurs. Interference is created, even if a receiver that detects an error sends an ID information re-transmission instruction, because the ID information is sent again at the same time. In other words, an interference error occurs again.

Another problem with the "Supertag" system is that onetime transmission of ID information causes a high probability of reception errors in a high-noise environment.

Moreover, since each tag contains a phase-locked loop (PLL) circuit that internally generates a timing signal and that synchronizes the generated timing signal with an ID transmission instruction, the chip size and the cost increase.

SUMMARY OF THE INVENTION

It is an object of the present invention to prevent interference caused by information transmitted from another communication apparatus or due to noise.

It is another object of the present invention to differentiate the information transmission timing of a given communication apparatus from the transmission timing of another communication apparatus.

It is still another object of the present invention to improve the noise resistance of an information receiver.

One of the foregoing objects is achieved by an aspect of the present invention through the provision of a communication apparatus including a selecting unit for selecting M different numbers, a receiving unit for receiving a signal, a clock generating unit for generating a clock from the signal received by the receiving unit, a counting unit for counting the generated clock, and a transmitting unit for transmitting information according to the clock count obtained by the counting unit and the selected numbers by the selecting unit.

One of the foregoing objects is achieved by another aspect of the present invention through the provision of a communication apparatus including a transmitting unit for transmitting a signal to supply a clock and power to at least one other different communication apparatus, a receiving unit for receiving information from the at least one other different communication apparatus, a determining unit for determining whether or not the receiving unit has received the same information a plurality of times, and an outputting unit for outputting the information received a plurality of times according to a determination result of the determining unit.

One of the foregoing objects is achieved by still another aspect of the present invention through the provision of a communication method including a selecting step of selecting M different numbers, a receiving step of receiving a signal, a clock generating step of generating a clock from the signal received in the receiving step, a counting step of counting the generated clock, and a transmitting step of transmitting information according to the clock count obtained in the counting step and the selected numbers in the selecting step.

One of the foregoing objects is achieved by still another aspect of the present invention through the provision of a communication method including a transmitting step of transmitting a signal to supply a clock and power to at least one other different communication apparatus, a receiving step of receiving information from the at least one other different communication apparatus, a determining step of determining whether or not the same information has been received a plurality of times in the receiving step, and an outputting step of outputting the information received a plurality of times according to a determination result obtained in the determining step.

Further objects, features and advantages of the present invention will become apparent from the following description of the preferred embodiments with reference to the attached drawings.

DESCRIPTION OF THE PREFERRED EMBODIMENTS

First Embodiment

Figure 1:
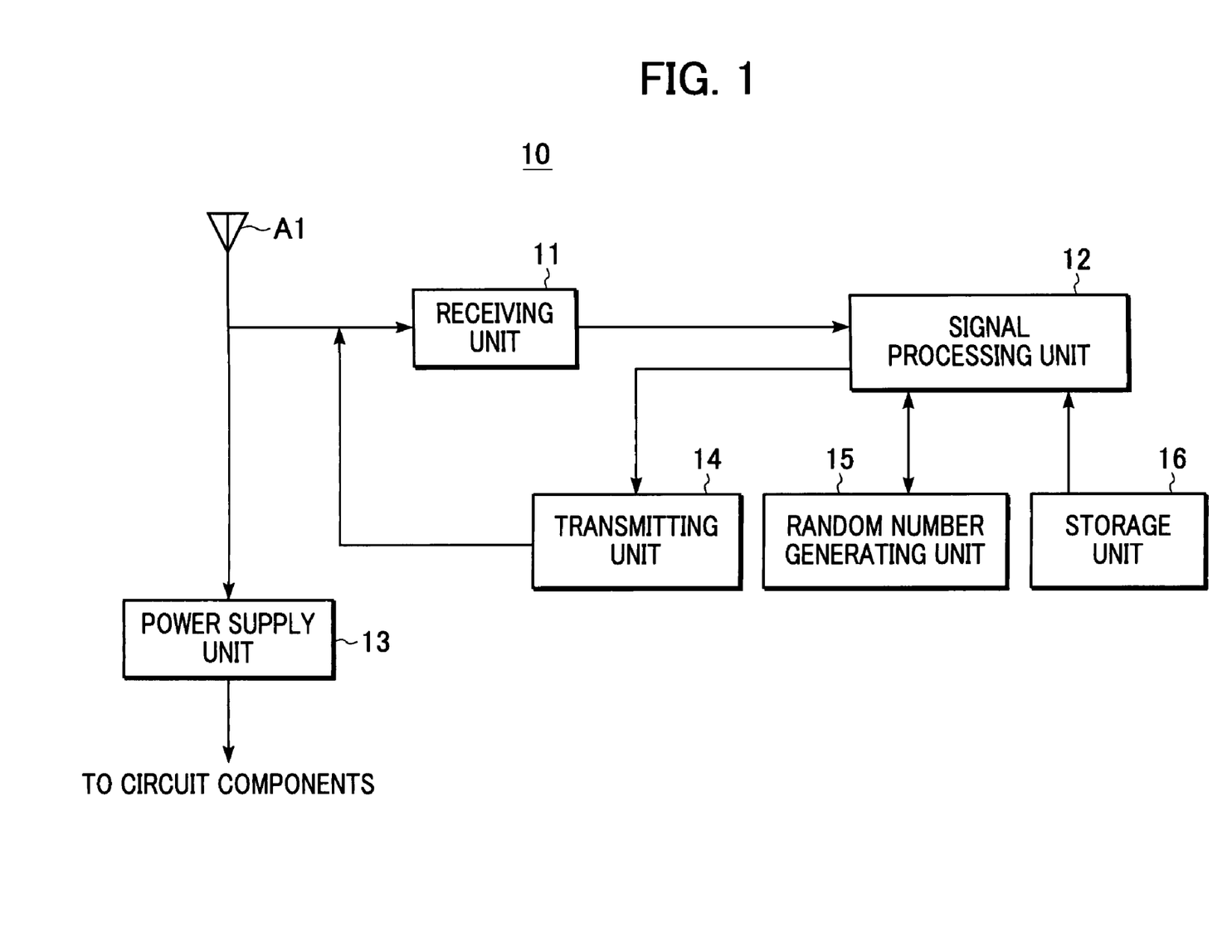
FIG. 1 is a circuit diagram of a transmitting apparatus 10 according to a first embodiment of the present invention.

FIG. 1 is a circuit diagram of a transmitting apparatus 10 according to a first embodiment of the present invention.

The transmitting apparatus 10 is preferably a radio tag or an RF-ID tag, including an antenna A1, a receiving unit 11, a signal processing unit 12, a power supply unit 13, a transmitting unit 14, a random number generating unit 15, and a storage unit 16. Though the transmitting apparatus 10 is preferably a radio tag or an RFID-tag, any apparatus (e.g., Bluetooth) allowing practice of the present invention is applicable.

Figure 2:
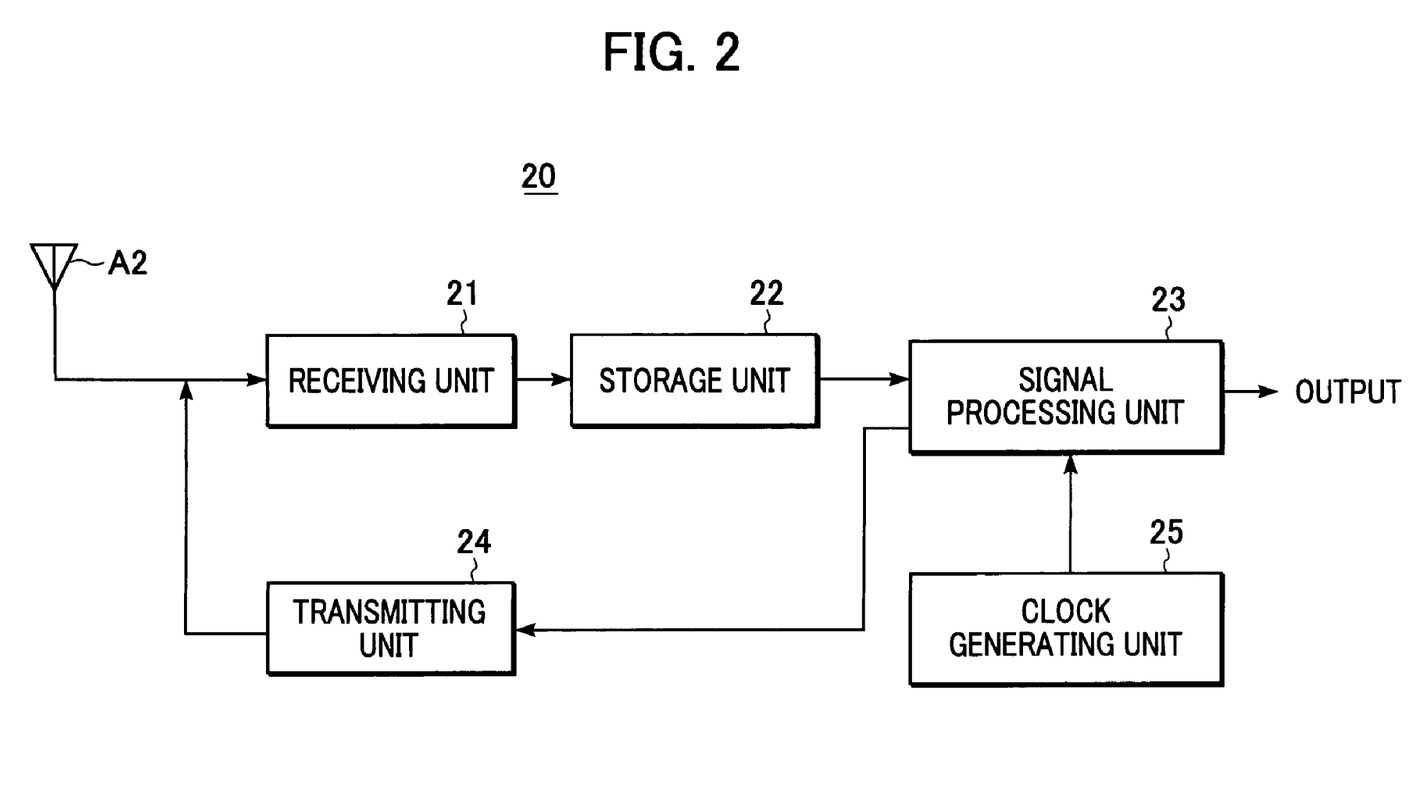
FIG. 2 is a circuit diagram of a receiving apparatus 20 according to the first embodiment of the present invention.

When the antenna A1 receives an ID transmission instruction sent from a receiving apparatus 20 shown in FIG. 2, the power supply unit 13 generates the power necessary for operating the overall circuit of the transmitting apparatus 10 based on the received ID transmission instruction. The generated power is supplied to the respective circuit components. D.C. power is obtained by rectifying and smoothing the ID transmission instruction (i.e., radio wave). Processing such as rectification and smoothing is performed by the power supply unit 13.

The receiving unit 11 receives the ID transmission instruction and decodes a clock contained in the ID transmission instruction. The decoded clock is transmitted to the signal processing unit 12. The signal processing unit 12 counts the clock, and instructs the random number generating unit 15 to generate M random numbers.

The random number generating unit 15 transmits the M generated random numbers to the signal processing unit 12 in ascending order. The signal processing unit 12 compares the received clock count with the received random numbers. When a match is found, the signal processing unit 12 obtains ID information for identifying the transmitting apparatus 10 stored in the storage unit 16. The signal processing unit 12 transmits the obtained ID information to the transmitting unit 14. The transmitting unit 14 transmits the ID information to the receiving apparatus 20 via the antenna A1.

FIG. 2 is a circuit diagram of the receiving apparatus 20 according to the first embodiment of the present invention.

The receiving apparatus 20 is an apparatus that receives ID information, including an antenna A2, a receiving unit 21, a storage unit 22, a signal processing unit 23, a transmitting unit 24, and a clock generating unit 25.

In the receiving apparatus 20, the clock generating unit 25 generates a clock and sends the clock to the signal processing unit 23. The signal processing unit 23 generates an ID transmission instruction signal using the clock, and sends the generated signal to the transmitting unit 24. The transmitting unit 24 transmits the ID transmission instruction to the transmitting apparatus 10 shown in FIG. 1 via the antenna A2. The receiving unit 21 receives the ID information transmitted by the transmitting apparatus 10 via the antenna A2, and the received ID information is stored in storage unit 22.

The operation of the transmitting apparatus 10 and the receiving apparatus 20 according to this embodiment will now be described.

Figure 3:
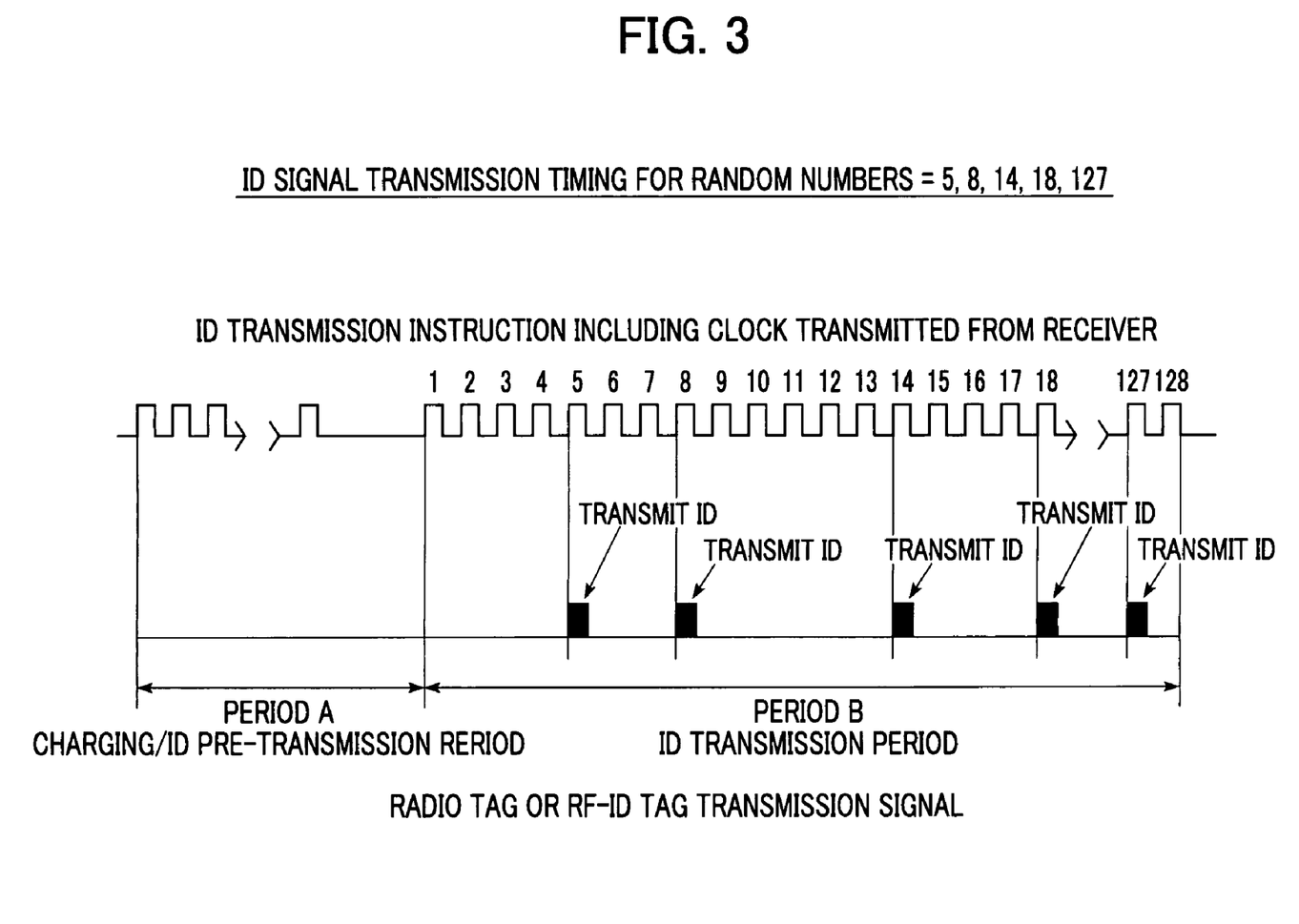
FIG. 3 is a diagram showing the principle of the transmitting apparatus 10 and the receiving apparatus 20 according to the present invention.

FIG. 3 is a diagram showing the principle of the transmitting apparatus 10 and the receiving apparatus 20 according to the embodiment.

The receiving apparatus 20 transmits a clock to the transmitting apparatus 10. The clock is represented by a power supply signal to supply power to the transmitting apparatus 10, and is also represented by an ID transmission instruction to instruct the transmitting apparatus 10 to transmit the ID information of the transmitting apparatus 10.

The transmitting apparatus 10, which receives the clock from the receiving apparatus 20 and uses the received clock, does not include an oscillator, such as a PLL circuit. When the transmitting apparatus 10 receives the ID transmission instruction, M random numbers are internally generated, and a counter counts the received clock. Each time the counter value matches the value of one of the generated random numbers, the ID information is transmitted. In other words, the transmitting apparatus 10 transmits the ID information M times.

The receiving apparatus 20 transmits an ID information transmission instruction containing a clock to the transmitting apparatus 10. The transmitting apparatus 10 generates power for operating the transmitting apparatus 10 from the ID transmission instruction transmitted in a period A, i.e., a charging/ID pre-transmission period, shown in FIG. 3, and supplies the power to the components of the transmitting apparatus 10 so as to prepare for transmission of the ID.

At the rise time of the ID transmission instruction to 1 after a long period of 0, the signal processing unit 12 counts the clock. Each time the clock count matches one of five random numbers (5, 8, 14, 18, and 127 in the example shown in FIG.

3) generated by the transmitting apparatus 10, the transmitting apparatus 10 transmits the ID information thereof to the receiving apparatus 20.

Only when the same ID information is received more than once does the receiving apparatus 20 determine that the ID information is valid. If the same ID information is not received, the receiving apparatus 20 determines that an error occurs, and sends the ID information transmission instruction to the transmitting apparatus 10 to transmit the ID information again.

The probability of interference occurring in this embodiment will now be described, presuming that the clock count is N and the number of random numbers generated by the random number generating unit 15 is M, where, for example, N=128 and M=5.

The probability that two different transmitting apparatuses 10 originate ID information five times at the same time is given by $1/_{128}P_5=1/3.1\times10^{10}$. The probability that the two transmitting apparatuses 10 originate ID information four times at the same time is given by $1/_{128}P_4=1/256032000$, and the probability that the two transmitting apparatuses 10 originate ID information three times at the same time is given by $1/_{128}P_3=1/2048256$. The probability that ID signals occur at the same time three times in an environment where K different transmitting apparatuses 10 exist is given by $(K-1)^3/_{128}P_3=(K-1)^3/2048256$.

Thus, the probability that ID signals occur at the same time three times in an environment where two different transmitting apparatuses 10 exist, i.e., K=2, is 1/2048256. This results in a very low likelihood of not being able to acquire ID information due to interference.

In an environment where 10 transmitting apparatuses 10 exist, i.e., K=10, the probability is $9^3/2048250=1/2809$, which is also very low. In a case where one transmitting apparatus 10 exists, the same ID information is received five times, with the merit of high noise resistance even in a high-noise environment.

If the number of transmitting apparatuses 10 is large (i.e., K is a high value), the clock count, i.e., N, must increase. Given that, for example, N=1000 and M=5, the probability that signals from K different transmitting apparatuses 10 occur at the same time three times is given by $(K-1)^3/_{1000}P_3=(K-1)^3/997002000$, and the probability for K=100 is 1/1027, which is also very low. This embodiment provides extensibility by supporting a large number of transmitting apparatuses.

The operation of the receiving apparatus 20 that receives ID information from the transmitting apparatus 10 having no internal battery (i.e., power is externally supplied to the transmitting apparatus 10) in accordance with this embodiment will now be described.

Figure 4:
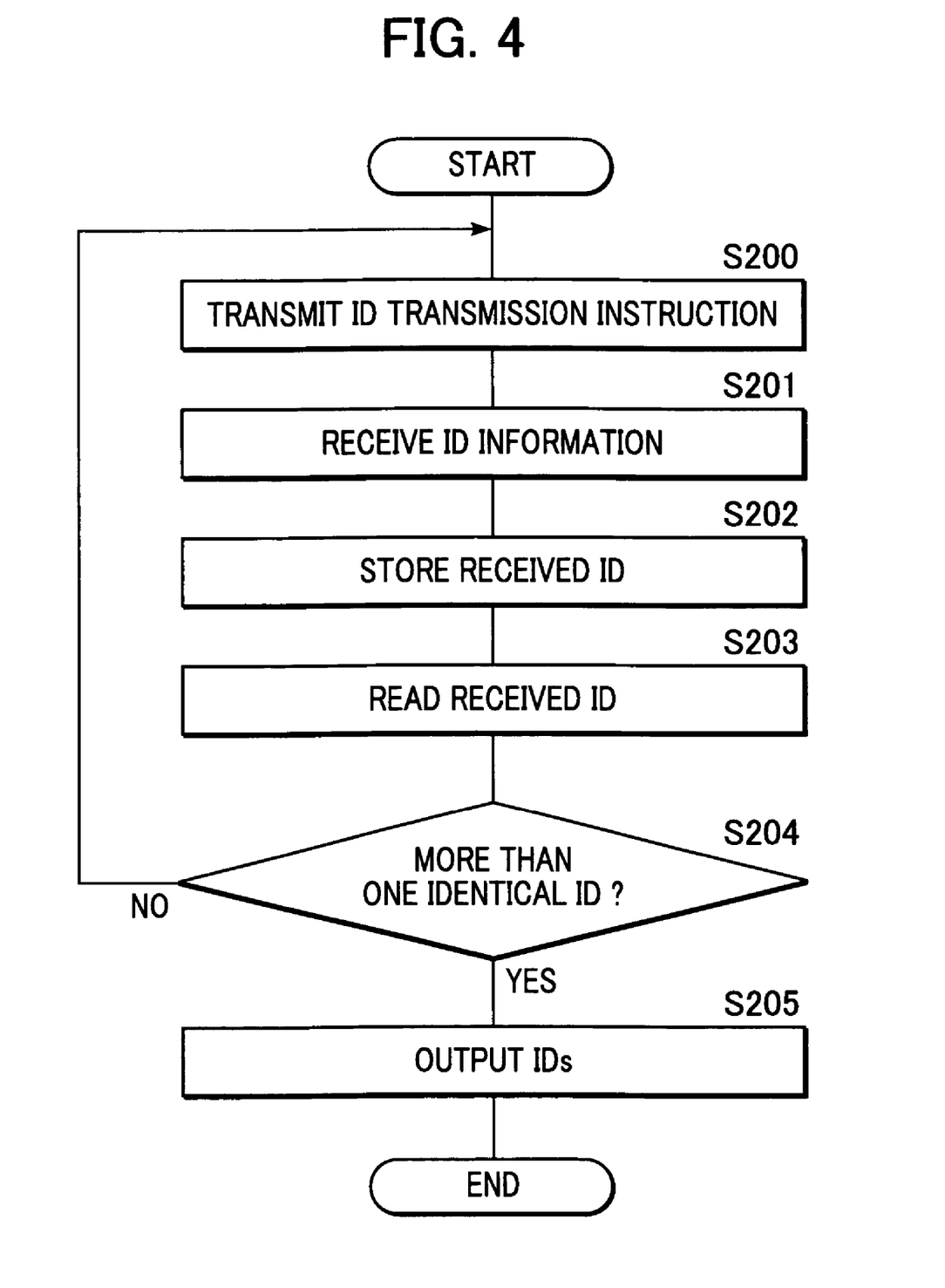
FIG. 4 is a flowchart showing the operation of the receiving apparatus 20 in accordance with the first and second embodiments of the present invention.

FIG. 4 is a flowchart showing the operation of the receiving apparatus 20 that receives ID information from the transmitting apparatus 10 having no internal battery in accordance with the embodiment.

In step S200, the receiving apparatus 20 originates an ID transmission instruction containing a clock to the transmitting apparatus 10. In step S201, the receiving apparatus 20 receives ID information sent from the transmitting apparatus 10. The received ID information is stored in step S202. In step S203, the stored ID information is read. In step S204, it is determined whether or not there is more than one identical ID.

If there is not more than one identical ID, it is determined that an error occurred, and the operation returns to step S200, where the ID transmission instruction is transmitted again. If there is more than one identical ID, flow proceeds to step S205, where all identical IDs are output and it is determined that the transmitting apparatuses 10 having the output IDs exist. The process then terminates.

The operation of the transmitting apparatus 10 having no internal battery, that is, power is externally supplied to the transmitting apparatus 10 in accordance with this embodiment will now be described.

Figure 5:
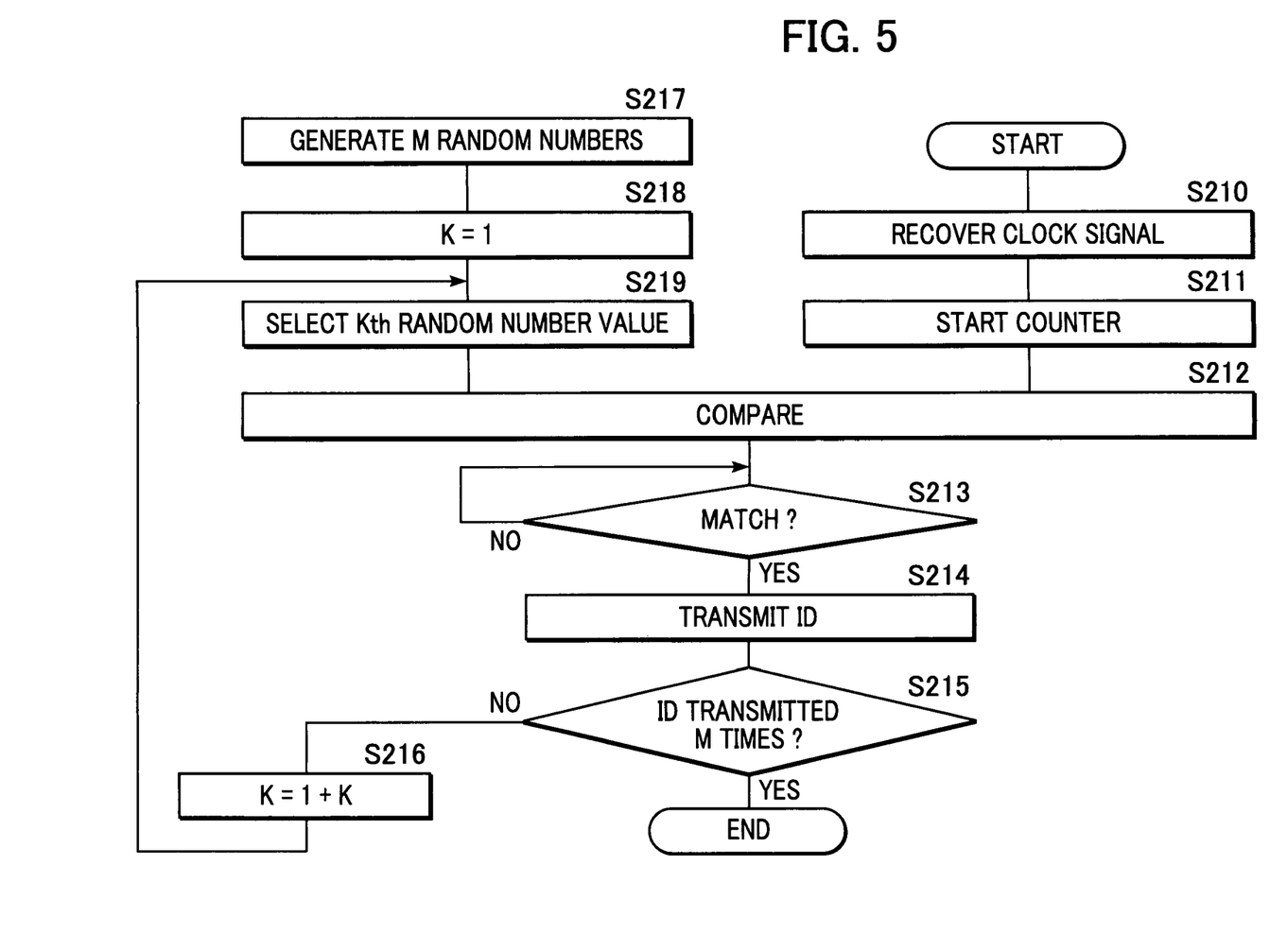
FIG. 5 is a flowchart showing the operation of the transmitting apparatus 10 in accordance with the first embodiment of the present invention.

FIG. 5 is a flowchart showing the operation of the transmitting apparatus 10 having no internal battery in accordance with the embodiment.

In step S210, the transmitting apparatus 10 that has received an ID transmission instruction generates a clock from the ID transmission instruction. In step S211, a counter starts in synchronization with the start time of the clock. In step S212, the clock count is compared with the value of the random number selected in step S219. Generation and selection of the random number is described below with respect to steps S217 through S219.

In step S213, it is determined whether or not a match is found. If a match is not found, the counter value and the random number are compared again. If a match is found, ID information is transmitted to the receiving apparatus 20 in step S214. In step S215, the number of times ID transmission was carried out is counted. If the ID information has been transmitted M times, the operation ends. If the ID information has been transmitted less than M times, flow proceeds to step S216 which is described below.

A procedure of generating random numbers in accordance with the embodiment will now be described.

In step S217, M random numbers are generated and arranged in ascending order. In step S218, K is set to 1, and, in step S219, the first random number is invoked. Jumping to step S215, if ID information has been transmitted less than M times, K=K+1 is calculated in step S216. When K=2 is obtained, the second random number is selected in step S219, and this random number is compared with the clock count in step S212 as discussed above.

The ID information transmitted by the transmitting apparatus 10 is received by the receiving unit 21 of the receiving apparatus 20 shown in FIG. 2 via the antenna A2, and the received ID information is stored in the storage unit 22. The signal processing unit 23 accesses the storage unit 22, and compares the received ID information. If the same ID information is received more than once, it is determined that the received ID information is valid, and the received ID information is output. Unless the same ID information is received more than once, the ID transmission instruction is transmitted again.

When the transmitting apparatus 10 receives the ID transmission instruction again, the random number generating unit 15 generates M random numbers different from the previous random numbers, and the transmitting apparatus 10 originates information, such as ID information, based on the new random numbers. Accordingly, new random numbers are generated after the ID information is transmitted and determination of the re-transmission timing of the ID information is based on the new random numbers. This prevents a recurrence from interference.

Figure 6:
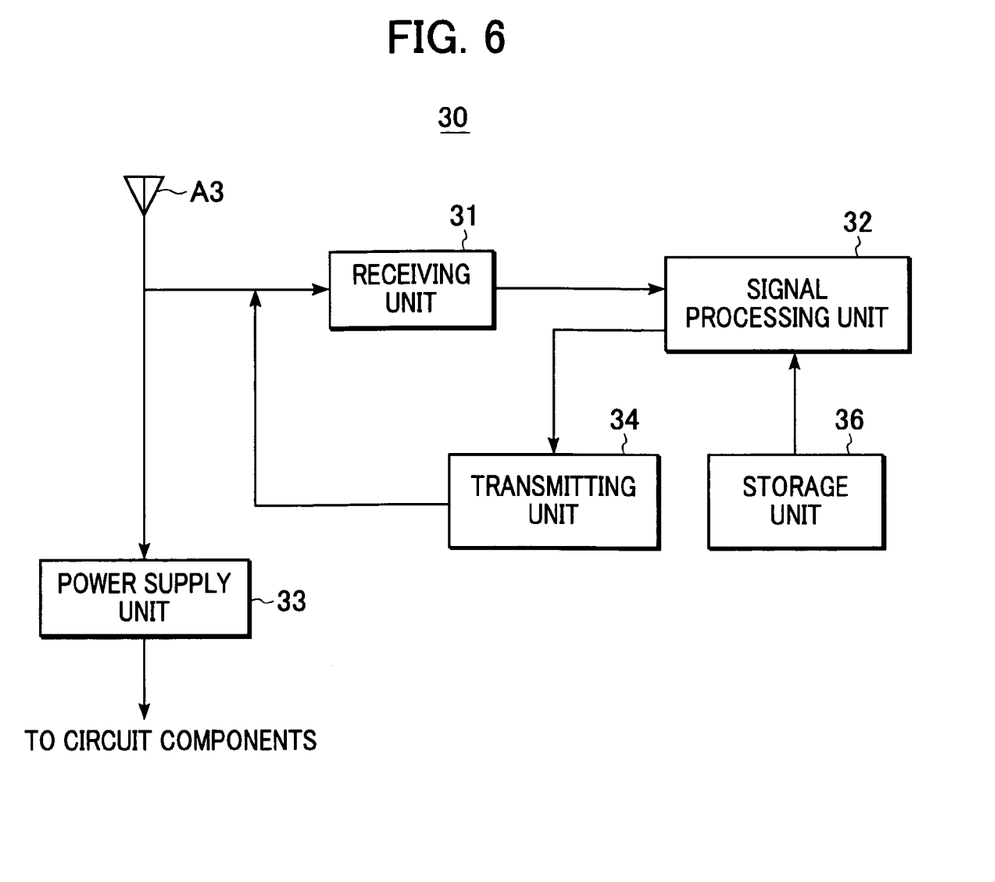
FIG. 6 is a circuit diagram of a transmitting apparatus 30 according to the second embodiment of the present invention.

FIG. 6 is a circuit diagram of a transmitting apparatus 30 according to a second embodiment of the present invention.

The transmitting apparatus 30 includes a storage unit 36 having L numbers recorded therein, where L>M, in place of the random number generating unit 15 of the transmitting apparatus 10 shown in FIG. 1.

The transmitting apparatus 30 includes an antenna A3, a receiving unit 31, a signal processing unit 32, a power supply unit 33, a transmitting unit 34, and the storage unit 36.

Figure 7:
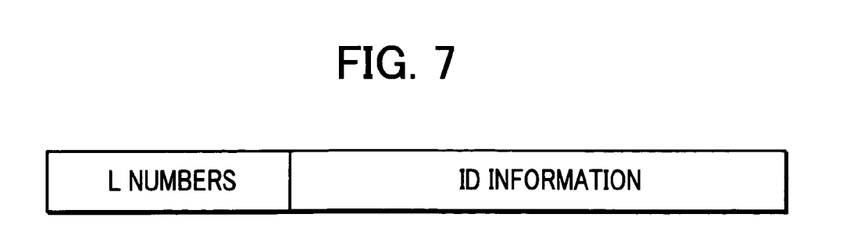
FIG. 7 is a view showing that L numbers and ID information are stored in a storage unit 36 in accordance with the second embodiment of the present invention.

FIG. 7 depicts the preferred structure of storing the L numbers and ID information in the storage unit 36 in accordance with the second embodiment. The structure of storing the L numbers and ID information is not limited to example depicted in FIG. 7, and any storage method that would allow practice of the present invention is applicable.

The L numbers achieve substantially the same function as that of the random numbers generated by the random number generating unit 15 shown in FIG. 1. When an ID transmission instruction is received by the antenna A3, power is generated by the power supply unit 33, and is supplied to the respective components. Based on the power supplied by the power supply unit 33, the receiving unit 31 receives the ID transmission instruction, extracts clock information from the received ID transmission instruction, and then transmits it to the signal processing unit 32.

The signal processing unit 32 generates a timing signal in coordination with the received clock information to count the clock. Furthermore, M numbers are selected from the L numbers and are arranged in ascending order. The M numbers are compared with the count of the timing signal. Each time a match is found, the ID information retrieved from the storage unit 36 is transmitted to the transmitting unit 34, and the transmitting unit 34 transmits the ID information to the receiving apparatus 20 shown in FIG. 2 via the antenna A3.

Where L is set to a non-integer multiple of M, a combination of M numbers shifts each time M numbers are selected from the L numbers. This prevents the same combination on every (L/M)+1.

Figure 8:
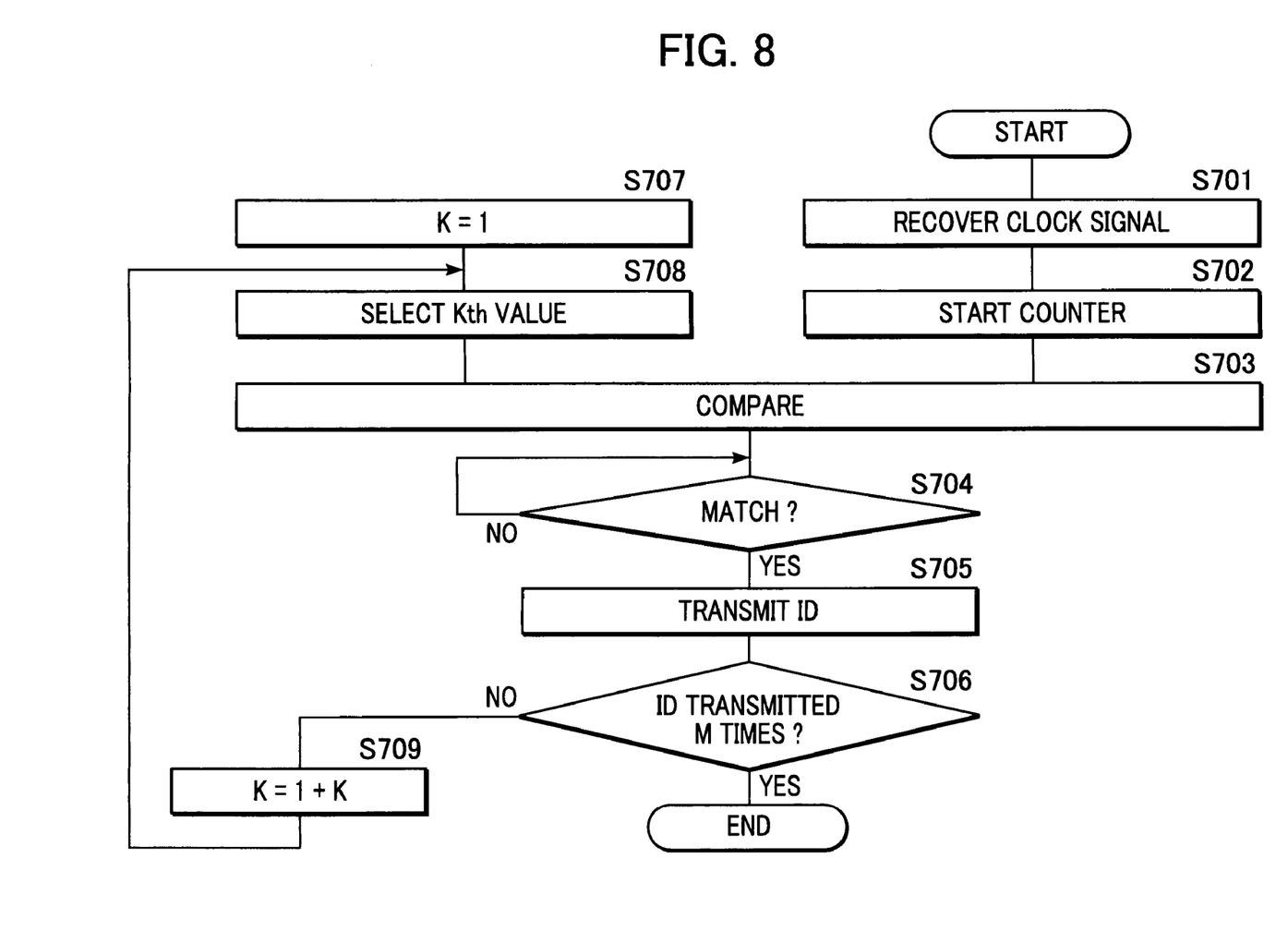
FIG. 8 is a flowchart showing the operation of the transmitting apparatus 30 in accordance with the second embodiment of the present invention.

FIG. 8 is a flowchart showing the operation of the transmitting apparatus 30.

The operation shown in the flowchart of FIG. 8 is performed using the transmitting apparatus 30 shown in FIG. 6 and the receiving apparatus 20 shown in FIG. 2.

In step S701, a clock is decoded from the received ID transmission instruction. In step S702, a counter starts to count the clock. In step S703, the number selected in step S708 (described below) is compared with the counter value obtained in step S702. If it is determined in step S704 that a match is found, ID information is transmitted in step S705. If it is determined that a match is not found, the selected value and the clock count are compared again in step S703.

As indicated above, ID information is transmitted in step S705. Flow then proceeds to step S706, where the number of times ID transmission was carried out is counted. If the number of times transmission was carried out is M, the operation ends. If the number of times transmission was carried out is less than M, flow proceeds to step S709 (described below).

In step S707, K is set to 1. In step S708, first M numbers are selected from the L numbers and are arranged in ascending order. Then, the first number is selected from the M numbers. In step S703, as discussed above, the selected number is compared with the counter value obtained from step S702. Jumping to step S706, if ID information has been transmitted less than M times, K=K+1 is calculated in step S709. When K=2 is obtained, the second number is selected in step S708.

According to the foregoing embodiments, information, such as ID information, is transmitted a plurality of times, and when the receiving apparatus 20 receives the same information more than once, it is determined that the received ID information is valid. This enhances the noise resistance. Moreover, the ID transmission timing changes each time ID information is transmitted M times, thus reducing the likelihood of interference.

According to the present invention, in an environment surrounded by a plurality of transmitting apparatuses, a receiving apparatus is able to correctly receive information from each of the transmitting apparatuses.

A high noise resistance and high reliability information acquisition can also be achieved.

The above described embodiment provides extensibility in that a large number of transmitting apparatuses may be supported by changing parameters.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A communication apparatus comprising:
   a receiving device configured to receive an instruction signal instructing to transmit identification information;
   a number generating device configured to generate M different random numbers in response to receipt of the instruction signal;
   a power generating device configured to generate power for operating the communication apparatus from the instruction signal received by the receiving device;
   a clock decoding device configured to decode a clock contained in the instruction signal received by the receiving device;
   a counting device configured to count the decoded clock;
   a determination device configured to determine whether the number of clocks counted by the counting device matches one of the M different random numbers generated by the number generating device; and
   a transmitting device configured to transmit identification information of the communication apparatus, each time the number of clocks counted by the counting device matches one of the M different random numbers generated by the number generating device.

2. The communication apparatus according to claim 1, wherein the communication apparatus is a radio tag.

3. A method for communicating by a communication apparatus, the method comprising:
   a receiving step of receiving an instruction signal for instructing to transmit identification information;
   a number generating step of generating M different random numbers in response to receiving of the instruction signal by the receiving device;
   a power generating step of generating power for operating the communication apparatus from the instruction signal received in the receiving step;
   a clock decoding step of decoding a clock contained in the instruction signal received in the receiving step;
   a counting step of counting the generated clock;
   a determining step of determining whether the number of clocks counted in the counting step matches one of the M different random numbers generated in the number generating step; and
   a transmitting step of transmitting identification information of the communication apparatus, each time the number of clocks counted in the counting step matches one of the M different random numbers generated in the number generating step.

* * * * *